J. DILDINE.
Animal Traps.

No. 133,836.          Patented Dec. 10, 1872.

Witnesses.

Inventor.
John Dildine.
By his Attys.

UNITED STATES PATENT OFFICE.

JOHN DILDINE, OF LIMESTONEVILLE, PENNSYLVANIA.

IMPROVEMENT IN ANIMAL-TRAPS.

Specification forming part of Letters Patent No. 133,836, dated December 10, 1872.

*To all whom it may concern:*

Be it known that I, JOHN DILDINE, of Limestoneville, in the county of Montour and State of Pennsylvania, have invented a new and Improved Animal-Trap; and I do hereby declare the following to be a full and exact description of the same, reference being had to the accompanying drawing forming part of this specification, in which—

Figure 1:
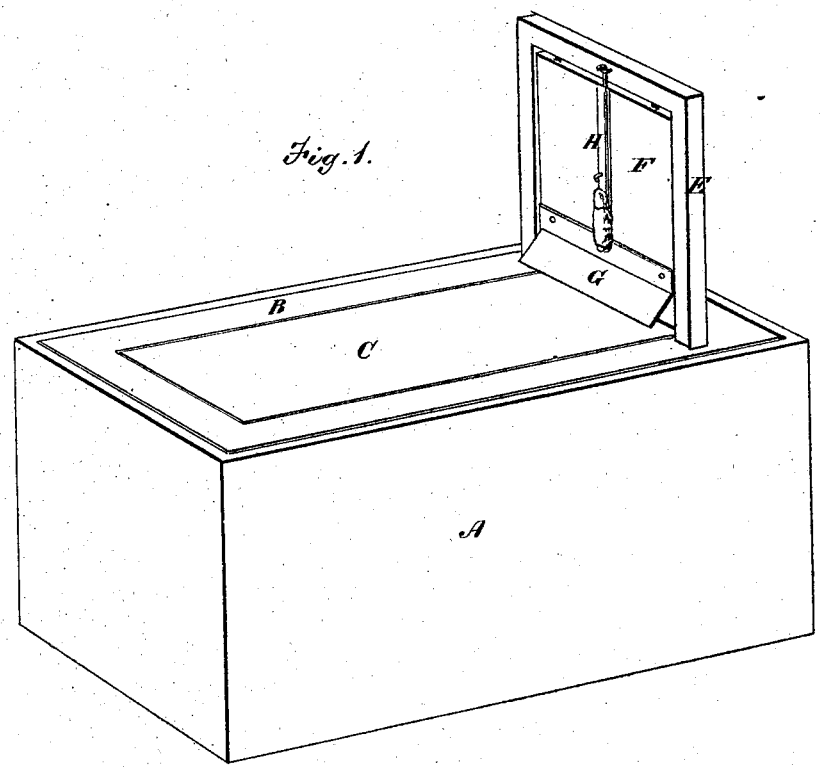
Figure 2:
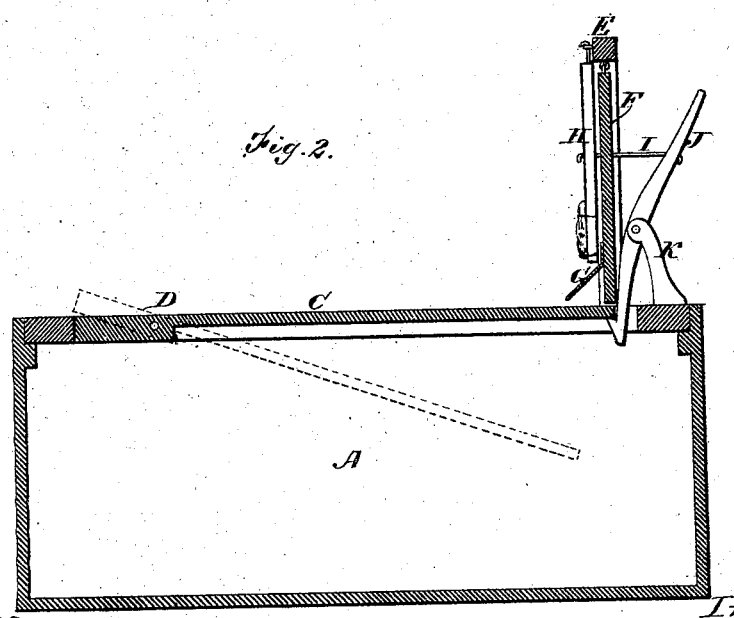

Figure 1 is a perspective view of my invention, and Fig. 2 a sectional elevation.

Similar letters of reference in the accompanying drawing denote the same parts.

My invention has for its object to improve the construction and operation of that class of animal-traps in which a weighted trap-door is combined with a bait-catch in such a manner that when the catch is released by the animal the trap-door shall precipitate him into a suitable receptacle and again rise and automatically set the trap. To this end the invention consists in the combination of parts by which the weight of the animal, together with his action in pulling upon the bait-catch, shall release the latter and spring the trap. By this means the operation of the trap is rendered more easy and certain.

A represents a rectangular box, in the top of which rests a frame, B. C represents a trap-door pivoted at D in the frame B, its shorter end being suitably weighted to counterbalance the longer end. The frame B is provided, immediately over the long end of the trap-door C, with a transverse vertical frame, E, from which is suspended the swinging apron F, the latter consisting of a rigid wooden or metallic piece, provided at its edge with a projecting metallic flange, G, which inclines downward over the end of the trap-door C, as shown in the drawing. An arm or lever, H, is suspended from the frame E on one side of the apron F, and is connected by a rod, I, passing through said apron with the upper end of the catch or trigger J, which latter consists of a lever pivoted in a standard, K, rising from the frame B, its lower end engaging with the longer end of the trap-door C close to the lower edge of the apron F, as shown in Fig. 2.

The bait being attached to the lower end of the arm H, the animal, in endeavoring to remove it, pulls the arm toward him with his teeth, and at the same time presses the flange G and the apron from him with his fore feet. The arm H being connected to the trigger above, and the apron being connected to it below the pivot, the whole force exerted by the animal, both upon the bait and against the flange G, is transmitted to the trigger and employed in moving it so as to disengage the trap-door and drop the animal into the receptacle beneath, after which the trap-door rises and sets itself again automatically.

When it is desired to remove or transport the contents of the box, the frame B with its connections may be taken out and a sliding cover introduced into suitable side grooves, by means of which the box is securely closed.

Having thus described my invention, what I claim is—

1. The inclined flange G and swinging bait-arm H, in combination with the swinging apron F, frame E, catch J, and weighted trap-door C, substantially as described, for the purpose specified.

2. In combination with the swinging apron, the catch J, and the weighted trap-door C, I claim the inclined flange G, substantially as described, for the purpose specified.

JOHN DILDINE.

Witnesses:
D. WEIDENHAMER,
WILLIAM H. DILDINE,
NICHOLAS C. DILDINE.